3,295,934
MANUFACTURE OF COMPLEX ALUMINOUS METAL-GLASS PRODUCTS OF HIGH STRENGTH

Michel Bré, Paris, France, assignor to Compagnie de Saint-Gobain, Neuilly-sur-Seine, France
No Drawing. Filed Jan. 8, 1963, Ser. No. 249,993
Claims priority, application France, Jan. 12, 1962, 884,684
20 Claims. (Cl. 29—182.5)

This invention relates to the manufacture of complex aluminous metal-glass products of high strength, which can be machined, worked, and drilled like metal.

The automotive and aviation industries are seeking new materials of high strength and light weight for the construction of, for instance, the cylinder heads and pistons of internal combustion engines and various parts of apparatus and engines which are subjected to substantial temperatures, for example 400° C., continuously or intermittently. Some of such objects must be capable of being machined to exact dimensions, turned on lathes, bored, drilled, and cut.

It is an object of this invention to prepare such objects from a new material which is hereinafter described with its preferred method of manufacture. The process is novel, the material made by the process is novel and is possessed of excelling qualities, and the products made from the material are light, strong, and durable.

The new products have mechanical properties which are specially interesting and have, from room temperature to about 400° C., a high specific resistance (the ratio of resistance to specific weight) to shearing and crushing. The hardness of these products is also great, being by Brinell test at room temperature about the order of that of high quality tool steel.

The objects of the invention are accomplished, generally speaking, by a method of making heterogeneous, aluminous metal-glass products which comprises compressing a mixture of small particles of moderately reactive glass and aluminum or aluminum alloy into a self-sustaining object, heating it to a temperature at which aluminum and glass react, molding it to final shape with pressure and heat, and cooling it. In this process it is important that the glass used in the reaction with the aluminum or aluminum alloy shall be attacked only moderately by the aluminum or aluminum alloy. Examples of such glasses are given herein in order that the method may be practiced without experimentation, but as it is impracticable to list all glasses for reactivity and as such information is not available in published works, a test is herewith supplied by which any glass can be tested:

Take a parallelepiped of glass of 20 x 20 mm. and of at least 7 mm. thickness and place one of the principal surfaces in contact with a bath of molten aluminum or aluminum alloy at 750° C. for 3 days, then withdraw it and cool slowly (e.g. 100° C. per hour) to room temperature. The glass plate must show a dark layer, resulting from reaction with the aluminum or aluminum alloy. If that layer has a mean thickness at least 1 mm. and not over 3 mm. the glass will have suitable, moderate reactivity and can be used in the process. If the penetration be less than 1 mm. the reactivity is too slow, and if it be more than 3 mm. the reactivity is too violent.

This empirical test has been confirmed by laboratory trials using the new method.

The new products are of novel constitution. There is a matrix rich in aluminum which contains elements liberated by the reaction, for instance silicon, and this matrix contains a dispersed phase which is insoluble in it and includes numerous particles of glass, the outsides of which have reacted with the aluminum or aluminum alloy and contain oxides, specially alumina. The product is very compact and in particular, free from splits, said splits being practically unavoidable when a glass strongly attacked by aluminum or aluminum alloy is used.

The aluminum or aluminum alloy is preferably used in minute particles, frequently as flakes, which can be purchased commercially, but when so purchased they usually have an outer layer of oxide and a coating of grease, e.g. stearin or stearic acid, to prevent further oxidation. This coating is preferably removed by heating in the air or in slightly oxidizing gas which increases the alumina content. The alumina content of the aluminum or aluminum alloy particles may be between .5 and 20% by weight of the particles freed from grease. An alumina content of 5 to 20% is desirable and 7 to 12% is preferred.

When aluminum alloys are used they should have high aluminum content preferably above 75% by weight. The alloys of aluminum with silicon containing 13% Si, known in France as AS13, and those of aluminum with magnesium called AG3 and AG5 are typically useful. The aluminous metal is favored for use in flakes which pass through a screen of 150 mu openings, and a flake which will pass apertures of 50 mu is even better.

Among the glasses which have the requisite moderate reactivity with Al and its alloys are several families having as distinctive characteristics high silica and low alkali metal oxide, the silica being at least 42% and the alkali metal oxide either absent or not in excess of 6% by weight.

One of these families of glass contains at least 80% by weight of Si, Mg, and Al oxides which are present in the relative proportions by weight of $SiO_2$ 45 to 57% by weight, MgO 15 to 28%, and $Al_2O_3$ 20 to 30%. In addition to silica, magnesia, and alumina this family may contain minor amounts of secondary constituents, for instance divalent metal oxides such as ZnO, BaO, PbO, and CaO, alkali metal oxides, and iron oxide, which may appear either by addition or as impurities. In general the content of such secondary constituents is kept low in order to maintain uniform conditions of reaction, and to prevent forming volatile or hygroscopic by products. CaO in particular should not usually exceed about 2% by weight.

Good results have also been obtained with the family of glasses which have a minimum of 82% by weight of $SiO_2$ and $B_2O_3$ in proportions of $SiO_2$ 72 to 82% and $B_2O_3$ 10 to 18%. In addition to these constituents these glasses may contain limited quantities of secondary constituents for instance divalent metal oxides such as ZnO, BaO, PbO and CaO, alkali metal oxides, aluminum oxide and iron oxide. In said family the CaO content may approach 4% by weight.

A particular family of glasses, which yields excellent results, has the following composition by weight: $SiO_2$ 72 to 82%, $B_2O_3$ 10 to 18%, CaO .5 to 3.5%, $Al_2O_3$ 1 to 5%, and alkali metal oxide 3 to 6%.

It is to be noted that when other types of glasses are used, they preferably contain no alkali metal oxide or alkali metal oxide not in excess of 6% by weight, in particular in order to avoid the exudation of the products which are soluble in water.

In practice the glass is finely divided, preferably in minute particles, for instance a powder which passes a 100 mu screen and has less than 10% by weight of particles smaller than 5 mu. Preferred results flow from the use of powder which passes through a 60 mu screen and contains less than 10% by weight of particles smaller than 10 mu. When maximum homogeneity, isotropy, and uniformity of fabrication are desired the particles smaller than 10 mu should be eliminated.

The proportion of aluminum or its alloy to glass is desirably kept between 50–75% by weight of the aluminous metal to 50–25% by weight of the glass.

The manipulative steps of the process have importance of their own. In the preferred process there is a first step of cold pressing of mixed particles of glass and metal, which is followed by release of pressure and heating to a temperature at which aluminum and the glass react, and thereafter by hot pressing to the final shape.

In the preferred process the fist step involves the molding of an intimate mixture of the glass and metal particles under pressure of for example, between 2 and 10 tons per cm.$^2$. It has been established that in some cases when pressures lower than 2 tons per cm.$^2$ are used, a final object having mediocre strength and low compactness results, and that at pressures above 10 tons per cm.$^2$ a stratification normal to the direction of application follows and harmfully affects the mechanical characteristics of the final product. The cold pressing can be applied directly to the intimate mixture of minute particles of glass and aluminum or aluminum alloy. One can also use an initial pressing of the intimate mixture of minute particles between 200 and 600 kg./cm.$^2$ so as to obtain a preform of selected shape which can be broken up so as to obtain a powder or larger particles, for instance one which can be screened through a screen of apertures between .5 and 1 mm. eliminating larger particles, that which passes the screen being subjected to a second pressing at 2 to 10 tons/cm.$^2$. The preform obtained by this double pressing is generally more homogeneous than that which is produced by a single pressing and is particularly free from stratifications.

After the preform has been made it may be put into a furnace at about 500° C., the temperature of which is being raised, for example, from 5 to 10 degrees per minute, to a temperature of 650 to 750° C. The heating may be stabilized as soon as the color of the preform suddenly becomes clearer, which is a satisfactory, obtainable end point. The preform is then kept in the furnace for a time which varies according to the nature of the glass and the precise qualities one desires the object to have, but which is generally between 5 and 40 minutes. It is during this period that the reaction between the aluminum and the glass proceeds most actively.

After the heating in the furnace has been carried out, as aforesaid, the preform is transferred to a mold which may be initially at 400 to 600° C. This mold may be of the shape and dimension desired in the final article, and it is again pressed at a high pressure, preferably above 3 tons/cm.$^2$, after which it is demolded and cooled.

A modification of the process, comprises only the steps of making the preform by cold pressing, then simultaneously heating it at 600–800° C. and pressing and finally demolding and cooling. Said simplified process may be used in some cases.

The following examples illustrate the invention but are not to be construed as a limitation on the generalities of what has been stated elsewhere herein.

*Example 1*

One hundred grams of aluminum flakes containing 15% of alumina, calculated on the weight of the metal free from grease, which had passed through a screen having apertures of 75 mu, is intimately mixed in a bladetype mixer with 50 grams of glass powder having the composition:

| | Percent by weight |
|---|---|
| $SiO_2$ | 50 |
| $Al_2O_3$ | 25.5 |
| MgO | 24.5 |

The particles of the glass powder are between 10 and 60 mu in size. The mixture thus produced is poured into a cylindrical mold provided with a piston. When the mold is full, the piston is introduced and a pressure of 5 tons/cm.$^2$ is applied. The preform is removed from the mold and put into an electric furnace at 500° C., the temperature of which is rising at about 5° C. per minute. When the furnace attained 700° C., it was observed that the temperature of the preform rose several tens of degrees above the temperature of the furnace. At the end of 3 to 5 minutes, it was observed that the temperature of the preform began to fall. This was continued for 20 minutes, then the hot preform was removed from the furnace and put into a second mold which was at 500° C. When the preform was in place, a piston was introduced and pressure applied to the same value, e.g. 5 tons/cm.$^2$. The molded piece was removed and allowed to cool in the free air at room temperature. It was a shape 60 mm. in diameter and 20 mm. thick. It was tested for hardness by Brinell hardness test and had an average hardness of 200 kg./mm.$^2$.

To determine its bending strength, a diamond point was used to cut out of the shape some parallelepipeds having dimensions of 50 x 10 x 10 mm., which were tested on classical testing machinery (Trayvou), and showed the figure for resistance to flexing at about 45 kg./mm.$^2$.

*Example 2*

In the same way as above, an intimate mixture of products was produced, including 400 grams of aluminum flakes conatining 10% of alumina calculated on the weight of the metal free from grease. These particles had passed through a screen having apertures of 50 mu. The mixture also contained 200 grams of glass powder containing 3% of particles less than 5 mu and 97% of particles from 5 to 100 mu, which had the composition:

| | Percent by weight |
|---|---|
| $SiO_2$ | 74 |
| $B_2O_3$ | 16 |
| $Na_2O$ | 4 |
| PbO | 6 |

One hundred grams of this mixture was poured into a cold mold and pressed at 500 kg./cm.$^2$. The shape was demolded and the process was repeated on additional increments of powder producing a plurality of preforms. These shapes were broken up in a mortar until they passed a 500 mu screen. These granules had an apparent density between 1.0 and 1.5 which is quite high.

The mixture of the granules was submitted to the same heating as the mixture of Example 1 with this difference, that there was a delay of 30 minutes in place of 20 between the moment when the temperature of the hot preform began to decrease and the moment when the preform was subjected to hot pressing.

The final piece, after pressing as in Example 1, and cooling to room temperature, was a shape of 60 mm. in diameter and 70 mm. in length. Its Brinell hardness averaged 250 kg./mm.$^2$.

By means of a diamond point, the shape was cut in two parts along the plane of a diameter. In one of these parts there was cut out, parallel to the generatrices of the cylinder, some parallelepipeds of 50 x 8 x 8 mm. From the other half there was cut out, parallel to the bases of the piece, some parallelepipeds of the same dimensions. These two series of test shapes were machined so as to produce test pieces of dumbell shape having a mid portion 4 mm. in diameter and heads 7 mm. in diameter. These were tested on an Amsler traction test machine and checked on other standard test machines. The mean value of the figures was practically the same for the two series of test shapes: 30 kg./mm.$^2$ at 20° C.; 16 kg./mm.$^2$ at 350° C.; and 7 kg./mm.$^2$ at 500° C. There was no elongation under these circumstances.

*Example 3*

One hundred and sixty grams of aluminum flakes containing 12% of alumina, calculated as aforesaid, having a particle size less than 75 mu, were intimately mixed with 100 grams of glass powder, the particles of which were from 5 to 75 mu, and the composition of which was:

| | Percent by weight |
|---|---|
| $SiO_2$ | 77 |
| $B_2O_3$ | 16 |
| $Al_2O_3$ | 2 |
| $Na_2O$ | 4 |
| $K_2O$ | 1 |

The mixture thus obtained was divided into parts of 25 grams. One of these was put into a cylindrical mold provided with a piston. The interior diameter of the mold was 30 mm. When the mold was full, the piston was introduced and applied a pressure of 7 tons/cm.$^2$. The preform was removed from the mold and heated in an electric furnace at 650° C. It was stabilized in temperature by means of a regulator. At the end of several minutes of heating, the temperature of the preform rose sharply and then commenced to fall. It was maintained in this state for 15 minutes and then transferred to a second mold similar to the first but which had been heated to 450° C. When the hot preform was in place, the piston was applied with pressure of 5 tons/cm.$^2$. The piece thus treated was removed from the mold and cooled to ordinary temperature in the free air. It was 30 mm. in diameter and 20 mm. thick and was subjected to machining by tungsten carbide tools to a preselected shape. It could be drilled and turned with high speed steel tools.

*Example 4*

In the same blade type mixer were put 210 grams of aluminum alloy powder containing, calculated as aforesaid, 81% of aluminum, 13% of silicon and 6% of alumina, which had passed a 50 mu screen, and 90 grams of glass powder containing 6% of particles less than 10 mu, and 94% of particles from 10 to 60 mu. The glass had the composition:

| | Percent by weight |
|---|---|
| $SiO_2$ | 58 |
| $B_2O_3$ | 7.5 |
| $Al_2O_3$ | 16 |
| MgO | 17 |
| $Na_2O$ | 1.5 |

This mixture was subjected to the same treatment as that of Example 1 except that the form was allowed to rest for 30 minutes between the moment when its temperature began to fall and the time when it was subjected to hot pressing. The final shape after cooling to room temperature was a cylinder 60 mm. in diameter and 40 mm. high. Hardness and compression tests were carried out on it. The Brinell hardness averaged 180 kg./mm.$^2$. By means of a diamond cutter's tool, cubes of 30 mm. on the side were cut out and subjected to compression tests on a Trayvou machine, yielding mean figures of resistance to compression of 65 kg./mm.$^2$.

It will be observed that the process of the invention has the following characteristics, in its preferred form:

The intimate mixture of minute particles of glass and aluminous metal are subjected to cold pressing to produce a preform. The preform is heated to a temperature at which aluminous metal and glass reacts which is between 600 and 800° C., a preferred range being between 650 and 750° C. The hot preform thus obtained is then pressed to its final shape.

In a modification of the process the intermediate stage of heating without pressure can be eliminated and the process telescoped into the steps of pressing the preform cold and then simultaneously heating it and pressing it at 600–800° C.

The appearance of the shapes produced by the process, their dimensions, and their chemical characteristics are similar to those of the aluminum and the aluminum alloys which are used in their manufacture, and this fact makes it possible to use them for similar purposes.

The resistance to traction, measured on test pieces removed from such shapes, falls generally within the following limits for the temperatures indicated: 28 to 35 kg./mm.$^2$ at 20° C.; 14 to 20 kg./mm.$^2$ at 350° C.; and 5 to 8 kg./mm.$^2$ at 500° C.

The results obtained are superior. This is especially remarkable at temperature in the neighborhood of 400° C. The resistance to compression measured on test pieces extracted from the shapes is generally superior to 60 kg./mm.$^2$, which corresponds to good construction materials such as mild steel.

The hardness measured on the Brinell scale varies with the relative proportions of glass and metals used in fabrication. For example, for shapes containing two parts by weight of metal to one part by weight of glass, the Brinell hardness is generally superior to 150 kg./mm.$^2$. It is especially high when the glass employed contains $B_2O_3$. For glasses containing more than 10% $B_2O_3$ by weight, the Brinell hardness reached 300 kg./mm.$^2$.

The shapes produced can be machined. Because of their hardness and abrasive character they usually require tools of tungsten carbide. In some cases it is better to use diamond pointed tools. Thus one may work the material on the lathe, one may drill it, and generally speaking, subject it to all the machining operations which are applicable to metals. It has been found after tests that there are certain limitations affecting glass compositions which circumscribes their utilization in this process. In particular the glass must be made only moderately attackable by aluminum. Glasses of this type should contain at most 6% by weight of alkali metal oxide. Thus glasses which have higher contents of alkali metal oxide, such as window glass and table glass, are habitually too strongly attacked by aluminum and its alloys and yields reaction products which are soluble in water. This lowers the resistance of such products to corrosion.

The glasses which contain a minimum of 80% of silica, magnesia, and alumina are satisfactory as has been set forth hereinabove. The utility of many glass compositions can be readily determined in advance by the empirical test which has been set forth hereinbefore.

The invention is particularly valuable in the manufacture of objects which have both low density and good mechanical strength at temperatures on the order of 300 to 400° C. For example, pistons and cylinder heads of internal combustion motors can be made from this material, and elements of the bodies of aircraft and of supersonic engines are also satisfactory when made by this process of this new material. Tubes and containers permeable to neutrons for nuclear use are satisfactory when made of these materials. Heat exchangers, turbine blades and the envelopes of gas turbines may be so made.

The shapes which are produced by the invention may be subjected to certain treatments in order to modify their properties. For example, they may be tempered or annealed, or they may be given precipitation treatment.

For example, the hot final shape may be put in an annealing oven and subjected to annealing.

The glass of the indicated compositions need not be made by the practitioner of the invention. They may be purchased from any manufacturer of glass by specifying the composition which is desired in terms of the content of metal oxide as has been done hereinabove in the examples.

As many apparently widely different embodiments of the present invention may be made without departing from the spirit and scope thereof, it is to be understood that the invention is not limited to the specific embodiments.

What is claimed is:

1. A compact composition of matter which is largely free of voids and has a matrix which is rich in aluminum and contains in solution elements resulting from the reaction of glass and aluminum, and in said matrix a dispersed phase which consists essentially of granular glass particles not more than 100 microns in size, the surfaces of which present a layer consisting essentially of alumina resulting from the reaction of the glass and the aluminum.

2. A composition of matter in accordance with claim 1 in which the glass contains at least 42% silica, 0 to 4% CaO, and not more than 6% alkali metal oxide, all by weight.

3. A method of making objects of composite structure having a matrix which is rich in aluminum and contains in solution elements resulting from the reaction of glass and aluminum, and a dispersed phase which consists essentially of granular glass particles the surfaces of which present a layer containing alumina resulting from the reaction of glass and aluminum, which comprises mixing metallic particles of the group consisting of aluminum and its alloys with granular particles of glass not more than 100 microns in size, and containing by weight at least 80% of the essential components:

|  | Percent |
|---|---|
| $SiO_2$ | 45–57 |
| MgO | 15–28 |
| $Al_2O_3$ | 20–30 | and as optional components 0 to 6% alkali metal oxide, and 0 to 20% of the class of divalent metal oxides other than MgO and iron oxide of which CaO is not to exceed 2%, compressing the mixture at room temperature under pressure at least equal to 200 kg./cm.² thereby producing a preform, heating the preform at a temperature at least equal to about 600° C. in order to initiate the reaction of aluminum and glass and thereafter cooling.

4. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises mixing metallic particles of the group consisting of aluminum and its alloys with granular particles of glass not more than 100 microns in size, and containing by weight at least 82% of $SiO_2$ and $B_2O_3$, which occur within the limits of $SiO_2$ 72 to 82% and $B_2O_3$ 10 to 18%, and as optional components 0 to 6% alkali metal oxide, 0 to 18% of the class of divalent metal oxides, alumina, and iron oxide, of which CaO is not to exceed 4%, compressing the mixture at room temperature under pressure at least equal to 200 kg./cm.² thereby producing a preform, heating the preform at a temperature at least equal to about 600° C. in order to initiate the reaction of aluminum and glass and thereafter cooling.

5. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises mixing metallic particles of the group consisting of aluminum and its alloys with granular particles of glass not more than 100 microns in size, and containing by weight:

|  | Percent |
|---|---|
| $SiO_2$ | 72–82 |
| $B_2O_3$ | 10–18 |
| CaO | .5–3.5 |
| $Al_2O_3$ | 1–5 |
| Alkali metal oxide | 3–6 | compressing the mixture at room temperature under pressure at least equal to 200 kg./cm.² thereby producing a preform, heating the preform at a temperature at least equal to about 600° C. in order to initiate the reaction of aluminum and glass and thereafter cooling.

6. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises mixing aluminum flakes and granular glass particles together, the glass particles being not more than 100 microns in size, and having the composition:

|  | Percent by weight |
|---|---|
| $SiO_2$ | about 50 |
| $Al_2O_3$ | about 25.5 |
| MgO | about 24.5 | compressing the mixture in a mold at room temperature and a pressure circa 2 to 10 metric tons per cm.² and thereby producing a preform, releasing the pressure, removing the preform from the mold, heating the preform at about 600° C. to 800° C., putting the prefrom in a mold at about 400° C. to 600° C., compressing the hot preform to final shape in said mold under pressure circa 2 to 10 metric tons per cm.² and releasing and cooling the shape.

7. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises mixing aluminum flakes and granular glass particles together, the glass particles being not more than 100 microns in size, and having the composition:

|  | Percent by weight |
|---|---|
| $SiO_2$ | About 74 |
| $B_2O_3$ | About 16 |
| $Na_2O$ | About 4 |
| PbO | About 6 | molding the mixture at about 500 kg./cm.², releasing the pressure, breaking the molded product into granules of 0.5 to 1 mm. size and of density about 1 to 1.5, compressing a mixture of granules in a mold at room temperature and a pressure circa 2 to 10 metric tons per cm.² and thereby producing a preform, releasing the pressure, removing the preform from the mold, heating the preform at about 600° C. to 800° C., putting the preform in a mold at about 400° C. to 600° C., compressing the hot preform to final shape in said mold under pressure circa 2 to 10 metric tons per cm.² and releasing and cooling the shape.

8. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises mixing aluminum flakes and granular glass particles together, the glass particles being not more than 100 microns in size, and having the composition:

| | Percent by weight |
|---|---|
| $SiO_2$ | About 77 |
| $B_2O_3$ | About 16 |
| $Al_2O_3$ | About 2 |
| $Na_2O$ | About 4 |
| $K_2O$ | About 1 | compressing the mixture in a mold at room temperature and under a pressure circa 2 to 10 metric tons/cm.$^2$ and thereby producing a preform, releasing the pressure, removing the preform from the mold, heating the preform at about 600° C. to 800° C., putting the preform in a mold at about 400° C. to 600° C., compressing the hot preform to final shape in said mold under pressure circa 2 to 10 metric tons per cm.$^2$ and releasing and cooling the shape.

9. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises mixing aluminum alloy powder containing about 13 percent silicon, and granular glass particles being not more than 100 microns in size, and particles together, the glass having the composition:

| | Percent by weight |
|---|---|
| $SiO_2$ | About 58 |
| $B_2O_3$ | About 7.5 |
| $Al_2O_3$ | About 16 |
| MgO | About 17 |
| $Na_2O$ | About 1.5 | compressing the mixture in a mold at room temperature and a pressure circa 2 to 10 metric tons per cm.$^2$ and thereby producing a preform, releasing the pressure, removing the preform from the mold, heating the preform at about 600° C. to 800° C., putting the preform in a mold at about 400° C. to 600° C., compressing the hot preform to final shape in said mold under pressure circa 2 to 10 metric tons per cm.$^2$ and releasing and cooling the shape.

10. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises compressing a mixture of granular particles of moderately reactive glass and of metallic particles of the class comprising aluminum and its alloys into a self-sustaining object, heating said object to a temperature at least equal to about 600° C. in order to initiate the reaction of aluminum and glass, and cooling it, said moderately reactive glass being glass which, when a plane surface of the glass is held in contact with a molten bath prepared from said metallic particles at about 750° C. for three days, and then cooled to room temperature at a rate of about 100° C. per hour, reacts with the bath to form a layer containing reaction product at least 1 mm. but not more than 3 mm. thick on said surface.

11. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises compressing a mixture of granular particles of moderately reactive glass and of metallic particles of the class comprising aluminum and its alloys into a self-sustaining object, heating said object to a temperature at least equal to about 600° C. in order to initiate the reaction of aluminum and glass, molding it to final shape in the hot state under a pressure greater than 1000 kg./cm$^2$, and cooling it, said moderately reactive glass being glass which, when a plane surface of the glass is held in contact with a molten bath prepared from said metallic particles at about 750° C. for three days, and then cooled to room temperature at a rate of about 100° C. per hour, reacts with the bath to form a layer containing reaction product at least 1 mm. but not more than 3 mm. thick on said surface.

12. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises compressing a mixture of granular particles of moderateley reactive glass and of metallic particles of the class comprising aluminum and its alloys into a self-sustaining object, the granular particles of glass being at most 100 mu in size and containing less than 10 percent by weight of particles less than 5 mu in size, heating said object to a temperature at least equal to about 600° C. in order to initiate the reaction of aluminum and glass, and cooling it, said moderately reactive glass being glass which, when a plane surface of the glass is held in contact with a molten bath prepared from said metallic particles at about 750° C. for three days, and then cooled to room temperature at a rate of about 100° C. per hour, reacts with the bath to form a layer containing reaction product at least 1 mm. but not more than 3 mm. thick on said surface.

13. A method of making objects of composite structure having a matrix which is rich in aluminum and contains in solution elements resulting from the reaction of glass and aluminum, and a dispersed phase which consists essentially of granular glass particles the surfaces of which present a layer containing alumina resulting from the reaction of glass and aluminum, which comprises compressing a mixture of granular particles of moderately reactive glass and of metallic particles of the class comprising aluminum and its alloys into a self-sustaining object, the granular particles of glass being at most 100 mu. in size and containing less than 10 percent by weight of particles less than 5 mu in size, heating said object to a temperature at least equal to about 600° C. in order to initiate the reaction of aluminum and glass, molding it to final shape in the hot state under a pressure greater than 1000 k./cm.$^2$, and cooling it, said moderately reactive glass being glass which, when a plane surface of the glass is held in contact with a molten bath prepared from said metallic particles at about 750° C. for three days, and then cooled to room temperature at a rate of about 100° C. per hour, reacts with the bath to form a layer containing reaction product at least 1 mm. but not more than 3 mm. thick on said surface.

14. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises compressing a mixture of granular particles of moderately reactive glass and of metallic particles of the class comprising aluminum and its alloys into a self-sustaining object, the granular particles of glass being at most 60 mu in size and containing less than 10 percent by weight of particles less than 10 mu in size, heating said object to a temperature at least equal to about 600° C. in order to initiate the reaction of aluminum and glass, and cooling it, said moderately reactive glass being glass which, when a plane surface of the glass is held in contact with a molten bath prepared from said metallic particles at about 750° C. for three days, and then cooled to room temperature at a rate of about 100° C. per hour, reacts with the bath to form a layer containing reaction product at least 1 mm. but not more than 3 mm. thick on said surface.

15. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises compressing a mixture of granular particles of moderately reactive glass and of metallic particles of the class comprising aluminum and its alloys into a self-sustaining object, the granular particles of glass being at most 60 mu in size and containing less than 10 percent by weight of particles less than 10 mu in size, heating said object to a temperature at least equal to about 600° C. in order to initiate the reaction of aluminum and glass, molding it to final shape in the hot state under a pressure greater than 1000 kg./cm.$^2$ and cooling it, said moderately eactive glass being glass which, when a plane surface of the glass is held in contact with a molten bath prepared from said metallic particles at about 750° C. for three days, and then cooled to room temperature at a rate of about 100° C. per hour, reacts with the bath to form a layer containing reaction product at least 1 mm. but not more than 3 mm. thick on said surface.

16. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction glass and aluminum, which comprises compressing a mixture of granular particles of moderately reactive glass and of metallic particles of the class comprising aluminum and its alloys into a self-sustaining object, the granular particles of glass being at most 60 mu in size and containing substaintially no particles less than 10 mu. in size, heating said object to a temperature at least equal to about 600° C. in order to initiate the reaction of aluminum and glass, and cooling it, said moderately reactive glass being glass which, when a plane surface of the glass is held in contact with a molten bath prepared from said metallic particles at about 750° C. for three days, and then cooled to room temperature at a rate of about 100° C. per hour, reacts with the bath to form a layer containing reaction product at least 1 mm. but not more than 3 mm. thick on said surface.

17. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises compressing a mixture of granular particles of moderately reactive glass and of metallic particles of the class comprising aluminum and its alloys into a self-sustaining object, the granular particles of glass being at most 60 mu in size and containing substantially no particles less than 10 mu in size, heating said object to a temperature at least equal to about 600° C. in order to initiate the reaction of aluminum and glass, molding it to final shape in the hot state under a pressure greater than 1000 kg./cm.$^2$, and cooling it, said moderately reactive glass being glass which, when a plane surface of the glass is held in contact with a molten bath prepared from said metallic particles at about 750° C. for three days, and then cooled to room temperature at a rate of about 100° C. per hour, reacts with the bath to form a layer containing reaction product at least 1 mm. but not more than 3 mm. thick on said surface.

18. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises mixing metallic particles of the group consisting of aluminum and its alloys with granular particles of glass containing by weight at least 80% of the essential components:

| | Percent |
|---|---|
| $SiO_2$ | 45–57 |
| $MgO$ | 15–28 |
| $Al_2O_3$ | 20–30 | and as optional components 0 to 6% alkali metal oxide, and 0 to 20% of the class of divalent metal oxides other than MgO and iron oxide of which CaO is not to exceed 2%, compressing the mixture at room temperature under pressure at least equal to 200 kg./cm.$^2$ thereby producing a preform, heating the preform at a temperature at least equal to about 600° C. in order to initiate the reaction of aluminum and glass, molding it to final shape in the hot state under a pressure greater than 1000 kg./cm.$^2$, and cooling it.

19. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises mixing metallic particles of the group consisting of aluminum and its alloys with granular particles of glass containing by weight at least 82% of $SiO_2$ and $B_2O_3$, which occur within the limits of $SiO_2$ 72 to 82% and $B_2O_3$ 10 to 18%, and as optional components 0 to 6% alkali metal oxide, 0 to 18% of the class of divalent metal oxides, alumina, and iron oxide, of which CaO is not to exceed 4%, compressing the mixture at room temperature under pressure at least equal to 200 kg./cm.$^2$ thereby producing a preform, heating the preform at a temperature at least equal to about 600° C. in order to initiate the reaction of aluminum and glass, molding it to final shape in the hot state under a pressure greater than 1000 kg.cm.$^2$, and cooling it.

20. A method of making objects of composite structure having a matrix which is rich in aluminum and contains in solution elements resulting from the reaction of glass and aluminum, and a dispersed phase which consists essentially of granular glass particles the outsides of which present a layer containing alumina resulting from the reaction of glass and aluminum, which comprises mixing metallic particles of the group consisting of aluminum and its alloys with granular particles of glass containing by weight:

| | Percent |
|---|---|
| $SiO_2$ | 72–82 |
| $B_2O_3$ | 10–18 |
| CaO | .5–3.5 |
| $Al_2O_3$ | 1–5 |
| Alkalimetal oxide | 3–6 | compressing the mixture at room temperature under pressure at least equal to 200 kg./cm.$^2$ thereby producing a preform, heating the preform at a temperature at least equal to about 600° C. in order to initiate the reaction of aluminum and glass, molding it to final shape in the hot state under a pressure greater than 1000 kg./cm.$^2$, and cooling it.

References Cited by the Examiner

UNITED STATES PATENTS

| | | | |
|---|---|---|---|
| 2,559,572 | 4/1947 | Stalego | 75—206 |
| 2,743,553 | 5/1956 | Armistead | 106—54 X |
| 2,898,236 | 8/1959 | Long | 75—206 |
| 3,044,888 | 7/1962 | Provance | 106—52 X |
| 3,047,383 | 7/1962 | Slayter | 29—182.5 |
| 3,047,409 | 7/1962 | Slayter et al. | 75—206 |
| 3,078,553 | 2/1963 | Tragert et al. | 75—206 |
| 3,180,742 | 4/1965 | Bennett et al. | 29—182.5 X |

L. DEWAYNE RUTLEDGE, *Primary Examiner.*

REUBEN EPSTEIN, LEON D. ROSDOL, *Examiners.*

R. L. GOLDBERG, R. L. GRUDZIECKI,
*Assistant Examiners.*